US011874666B2

(12) United States Patent
Hasegawa et al.

(10) Patent No.: US 11,874,666 B2
(45) Date of Patent: Jan. 16, 2024

(54) SELF-LOCATION ESTIMATION METHOD

(71) Applicant: HONDA MOTOR CO., LTD., Tokyo (JP)

(72) Inventors: Yuji Hasegawa, Saitama (JP); Sango Matsuzaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 716 days.

(21) Appl. No.: 16/975,259

(22) PCT Filed: Jan. 28, 2019

(86) PCT No.: PCT/JP2019/002705
§ 371 (c)(1),
(2) Date: Aug. 24, 2020

(87) PCT Pub. No.: WO2019/202806
PCT Pub. Date: Oct. 24, 2019

(65) Prior Publication Data
US 2020/0401152 A1 Dec. 24, 2020

(30) Foreign Application Priority Data

Apr. 20, 2018 (JP) .................................. 2018-081742

(51) Int. Cl.
*G01C 15/00* (2006.01)
*G01C 21/08* (2006.01)
(Continued)

(52) U.S. Cl.
CPC ......... *G05D 1/0221* (2013.01); *G01C 15/002* (2013.01); *G01C 21/08* (2013.01);
(Continued)

(58) Field of Classification Search
CPC .. G05D 1/0221; G05D 1/0251; G05D 1/0259; G05D 1/0272; G05D 1/02;
(Continued)

(56) References Cited

U.S. PATENT DOCUMENTS 8,165,844 B2 * 4/2012 Luinge ................ A61B 5/1126
382/128
8,387,193 B2 * 3/2013 Ziegler ................ A47L 9/2852
15/340.1
(Continued)

FOREIGN PATENT DOCUMENTS

CN 108230240 A * 6/2018 ........... G06K 9/6218
CN 110214264 A * 9/2019 ............ B60W 10/04
(Continued)

OTHER PUBLICATIONS

International Search Report, dated Feb. 4, 2019, 2 pages.
(Continued)

*Primary Examiner* — Jeffrey P Aiello
(74) *Attorney, Agent, or Firm* — Rankin, Hill & Clark LLP

(57) ABSTRACT

The present invention provides a self-location estimation method including: a first step of estimating the self-location of a moving body (1) from the detection information of a plurality of sensors (5) to (8) by using a plurality of algorithms (11) to (13); a second step of determining a weighting factor for each algorithm from one or more state quantities A, B and C, which are obtained by estimation processing for each of a plurality of algorithms, by using a trained neural network (14); and a third step of identifying, as the self-location of the moving body (1), a location obtained by synthesizing the self-locations, which have been estimated by the algorithms, by using weighting factors.

1 Claim, 2 Drawing Sheets

(51) Int. Cl.
*G01C 22/00* (2006.01)
*G05D 1/02* (2020.01)
*G06N 3/08* (2023.01)
*G06T 7/73* (2017.01)
*G06N 3/04* (2023.01)

(52) U.S. Cl.
CPC ............ *G01C 22/00* (2013.01); *G05D 1/0251* (2013.01); *G05D 1/0259* (2013.01); *G05D 1/0272* (2013.01); *G06N 3/04* (2013.01); *G06N 3/08* (2013.01); *G06T 7/74* (2017.01); *G06T 2207/20084* (2013.01)

(58) Field of Classification Search
CPC .............. G05D 1/0246; G06T 7/74; G06T 2207/20084; G01C 15/002; G01C 21/20; G01C 21/28; G01C 21/30; G01C 21/08; G01C 22/00; G06N 3/04; G06N 3/08; H04N 19/597
USPC ............ 342/147, 357.34, 451; 382/103, 107, 382/153–154; 700/245, 250, 253, 255, 700/258–259; 701/1, 23, 26, 28, 300, 701/400, 408, 472; 702/94–95, 104, 702/150–152, 189; 901/1, 46–47
See application file for complete search history.

(56) References Cited

U.S. PATENT DOCUMENTS

| | | | | |
|---|---|---|---|---|
| 8,417,383 | B2* | 4/2013 | Ozick | G05D 1/0231 |
| | | | | 700/258 |
| 8,467,928 | B2* | 6/2013 | Anderson | G05D 1/00 |
| | | | | 701/1 |
| 10,901,431 | B1* | 1/2021 | Ebrahimi Afrouzi | G06T 7/73 |
| 11,501,105 | B2* | 11/2022 | Kangaspunta | G06F 16/29 |
| 2003/0158709 | A1* | 8/2003 | Ishida | G05B 13/0285 |
| | | | | 702/189 |
| 2007/0010965 | A1* | 1/2007 | Malchi | G01S 19/51 |
| | | | | 702/151 |
| 2008/0285805 | A1* | 11/2008 | Luinge | G06F 3/011 |
| | | | | 382/128 |
| 2011/0040513 | A1* | 2/2011 | O'Gorman | G01D 3/036 |
| | | | | 702/94 |
| 2016/0082597 | A1* | 3/2016 | Gorshechnikov | G06V 10/462 |
| | | | | 901/1 |
| 2016/0157828 | A1* | 6/2016 | Sumi | G01N 29/46 |
| | | | | 702/189 |
| 2017/0364090 | A1* | 12/2017 | Grufman | G05D 1/0274 |

FOREIGN PATENT DOCUMENTS

| | | | | |
|---|---|---|---|---|
| JP | 2007-149088 | | 6/2007 | |
| JP | 2016-024598 | | 2/2016 | |
| JP | 2016024598 | A * | 2/2016 | .............. G05D 1/02 |
| JP | 2018-017826 | | 2/2018 | |
| KR | 20200127218 | A * | 2/2016 | ............. G01C 21/32 |
| WO | 2013/002067 | A1 | 1/2013 | |

OTHER PUBLICATIONS

IPSJ Interaction 2017, Visual SLAM, Walking Motion Recognition System by Estimating Position and Pose of Leg Mounted Camera Devices Using Visual SLAM, Tai, Katsunori, et al., Listed in International Search Report, English abstract included, 3 pages.

* cited by examiner

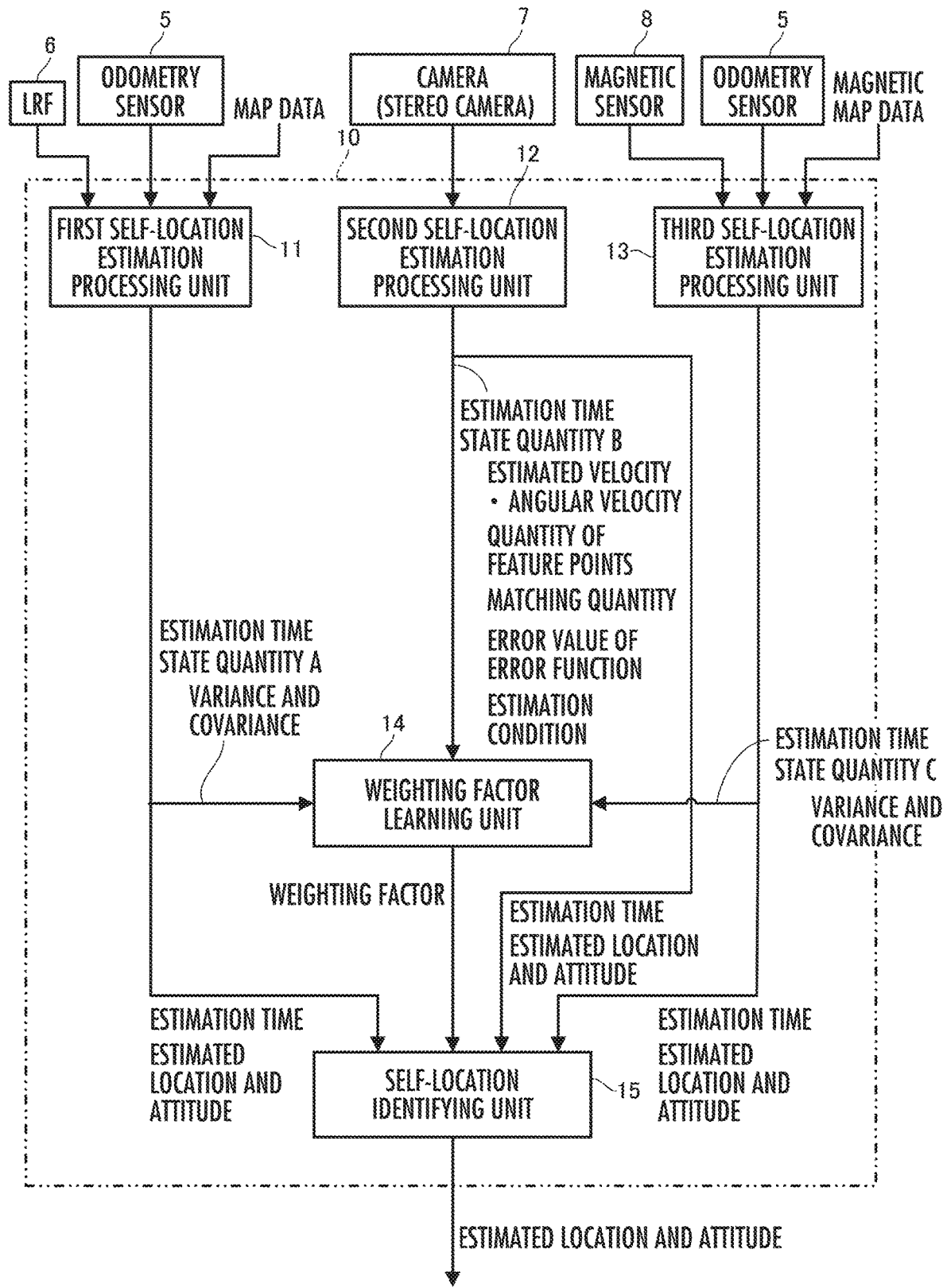

SELF-LOCATION ESTIMATION METHOD

TECHNICAL FIELD

The present invention relates to a method for estimating the self-location of a moving body.

BACKGROUND ART

Hitherto, there have been proposed a variety of techniques for estimating the self-location of a moving body, such as a mobile robot, by using the detection information of a plurality of sensors. For example, Patent Literature 1 proposes a technique for estimating the self-location of a moving body by using the detection information of an internal sensor, such as an encoder or gyroscope, and the detection information of an external sensor, such as a distance measuring sensor, an IR sensor, an ultrasonic sensor, or a camera.

There have conventionally been also proposed a variety of algorithms for estimating the self-location of a moving body by using the detection information of one or more sensors.

CITATION LIST

Patent Literature

Patent Literature 1: Japanese Patent Application Laid-Open No. 2007-149088

SUMMARY OF INVENTION

Meantime, in order to enable highly reliable estimation of a self-location under various environments, the self-location could be identified by estimating the self-location from the detection information of a plurality of sensors according to a plurality of algorithms and then synthesizing the estimated values of the plurality of self-locations by using appropriate weighting factors. In this case, the weighting factors could be learned in advance.

In this case, as a technique for learning the weighting factors, the difference between the estimated value of a self-location obtained by each algorithm and an actual location (an error of the estimated value of the self-location) could be used as input information to learn the weighting factors. In this case, however, the place where the learning is performed is inevitably limited to a particular place, so that it tends to be difficult to learn weighting factors that can be applied to various places other than the particular place.

The present invention has been made with a view of the background described above, and an object of the invention is to provide a self-location estimation method that enables the self-location of a moving body to be estimated in a manner insusceptible to an environment in which the moving body travels.

To this end, a self-location estimation method in accordance with the present invention includes: a first step of estimating the self-location of a moving body from detection information of a plurality of sensors by each of a plurality of algorithms using the detection information of one or more sensors among the plurality of sensors;

a second step of determining a weighting factor for each of the plurality of algorithms by inputting, to a trained neural network, one or more state quantities which are obtained for each of the plurality of algorithms by estimation processing of each algorithm and which are state quantities associated with certainty of the self-location estimated by each algorithm, and then determining a weighting factor for each of the plurality of algorithms by the neural network on the basis of the input state quantities; and a third step of identifying, as the self-location of the moving body, a location obtained by synthesizing the self-locations estimated by the plurality of algorithms by using the determined weighting factors (a first aspect of the invention).

In the present invention, the plurality of algorithms differ from each other in at least one of the type of each algorithm and the type of detection information of a sensor used for each algorithm.

Further, the self-location in the present invention may include the attitude (orientation) of the moving body rather than being limited to the location of a moving body in the usual sense (a coordinate location).

According to the first aspect of the invention, in the second step, the neural network determines the weighting factor for each of the plurality of algorithms receives, for each algorithm, one or more state quantities obtained by the estimation processing (the processing for estimating the self-location of the moving body) of each algorithm, and determines the weighting factor for each algorithm on the basis of the state quantities.

In this case, the state quantity for each algorithm is the state quantity associated with the certainty of the self-location of the moving body estimated by each algorithm. Hence, the state quantity for each algorithm reflects the degree of how properly the estimation processing of the algorithm has been performed in determining a highly reliable estimated value of the self-location of the moving body.

Therefore, the prior learning of the neural network enables the neural network to determine the weighting factor for each algorithm according to the overall state quantity for each input algorithm such that the weighting factor corresponding to each algorithm becomes relatively high in a situation in which the self-location estimation processing by the algorithm can be performed more appropriately than other algorithms and that the weighting factor becomes relatively low in a situation in which properly performing the self-location estimation processing by the algorithm is more difficult than other algorithms.

The weighting factor for each algorithm determined by the neural network is determined depending on the state quantity for each algorithm rather than the accuracy of the self-location of a moving body estimated by each algorithm. For this reason, the weighting factor is insusceptible to a place of an environment in which the moving body travels.

Then, in the third step, the location obtained by synthesizing the self-locations estimated by the plurality of algorithms by using the weighting factors determined as described above is identified as the self-location of the moving body.

Thus, according to the first aspect of the invention, the self-location of a moving body can be estimated in a manner insusceptible to an environment in which the moving body travels.

The foregoing first aspect of the invention may adopt a mode in which the plurality of sensors include a camera that images an external world of the moving body, and an A-th algorithm that is one algorithm among the plurality of algorithms is an algorithm configured to detect a feature point from a captured image of the camera and to sequentially perform processing for matching the detected feature point with a feature point detected from an image captured earlier than the captured image in order to estimate the self-location of the moving body. In this case, the state quantity related to the A-th algorithm preferably includes a state quantity that indicates the ratio of the quantity of feature points mapped by the matching to the total quantity of feature points detected from the captured image (a second aspect of the invention).

With this arrangement, the state quantity corresponding to the A-th algorithm includes a state quantity that indicates the ratio of the quantity of feature points mapped by the matching to the total quantity of feature points detected from the captured image. Thus, the state quantity becomes appropriate as a state quantity related to the certainty of the self-location of the moving body estimated by the A-th algorithm.

The state quantity indicating the ratio is not limited to the ratio itself, but may be, for example, a set of the total quantity of the feature points detected from the captured image and the quantity of the feature points mapped by the matching.

Further, the first aspect or the second aspect of the invention may adopt a mode in which the plurality of sensors include a distance measuring sensor that measures a distance to an external object of the moving body, and a B-th algorithm that is one algorithm among the plurality of algorithms is an algorithm which estimates the self-location of the moving body by using distance measurement data obtained by the distance measuring sensor and a particle filter. In this case, the state quantity related to the B-th algorithm preferably includes a covariance generated in the process of estimating the self-location of the moving body by the B-th algorithm (a third aspect of the invention).

With this arrangement, the state quantity corresponding to the B-th algorithm includes the covariance. Thus, the state quantity becomes appropriate as a state quantity related to the certainty of the self-location of the moving body estimated by the B-th algorithm.

The first to the third aspects of the invention may adopt a mode in which the plurality of sensors include a magnetic sensor that detects magnetism acting on the moving body, and a C-th algorithm that is one of the plurality of algorithms is an algorithm which estimates the self-location of the moving body by using the magnetism detection data obtained by the magnetic sensor and a particle filter. In this case, the state quantity related to the C-th algorithm preferably includes a covariance generated in the process of estimating the self-location of the moving body by the C-th algorithm (a fourth aspect of the invention).

With this arrangement, the state quantity corresponding to the C-th algorithm includes the covariance, so that the state quantity becomes appropriate as a state quantity related to the certainty of the self-location of the moving body estimated by the C-th algorithm.

BRIEF DESCRIPTION OF DRAWINGS

FIG. 2 is a block diagram illustrating the processing by a self-location estimation unit illustrated in FIG. 1.

DESCRIPTION OF EMBODIMENTS

Figure 1:
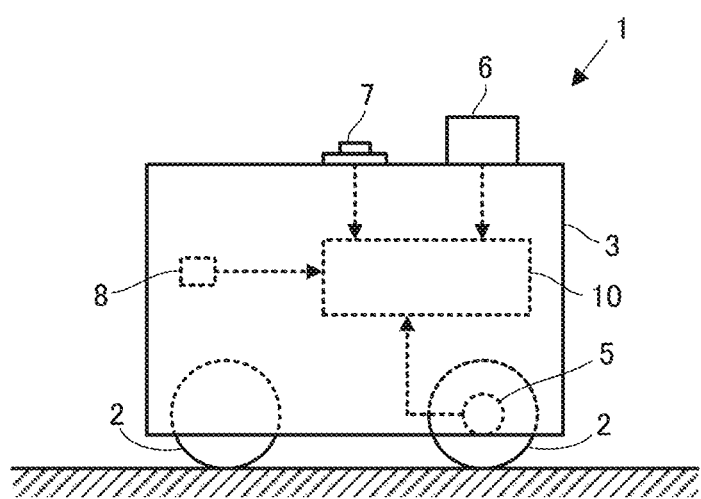
FIG. 1 is a diagram illustrating a schematic configuration of a moving body in an embodiment of the present invention.

An embodiment of the present invention will be described with reference to FIG. 1 and FIG. 2. Referring to FIG. 1, a moving body 1 is, for example, a wheeled moving body, and has a body 3 supported, through the intermediary of a plurality of wheels 2, on a floor surface of an environment in which the moving body 1 travels. Further, the moving body 1 travels on the floor surface by rotatively driving one or more wheels 2 by an actuator, such as an electric motor (not illustrated), or by rotatively driving one or more wheels 2 and steering (direction change).

The moving body 1 is provided with a plurality of sensors used to estimate the self-location thereof. For example, the moving body 1 has an odometry sensor 5, such as an angle sensor which detects the rotation angles of one or more wheels 2, a laser range finder 6 (hereinafter referred to as the LRF 6) serving as a distance measuring sensor that measures the distance to an external object existing around the moving body 1, a camera 7 that images a ceiling existing above the moving body 1, and a magnetic sensor 8 that detects magnetism acting on the moving body 1. The odometry sensor 5 may include a sensor that detects the steering angle of a steering wheel among the wheels 2 in addition to the angle sensor that detects the rotation angles of the wheels 2. Further, the camera 7 in the present embodiment is a stereo camera.

The moving body 1 includes a self-location estimation processing device 10 that estimates the self-location by using the detection information of the foregoing sensors. The self-location estimation processing device 10 is composed of, for example, one or more electronic circuit units that include microcomputers, memories, interface circuits and the like.

Further, the self-location estimation processing device 10 includes a first self-location estimation processing unit 11, a second self-location estimation processing unit 12, a third self-location estimation processing unit 13, a weighting factor learning unit 14, and a self-location identifying unit 15 as the functions implemented by both or one of installed hardware configuration and programs (software configuration), as illustrated in the block diagram of FIG. 2. The functions of the self-location estimation processing device 10 are not limited to the foregoing functions and may include, for example, a function for controlling the travel of the moving body 1.

The first self-location estimation processing unit 11 is a functional unit that performs the processing for estimating the self-location of the moving body 1 by using the detection information of the LRF 6 and the detection information of the odometry sensor 5, the second self-location estimation processing unit 12 is a functional unit that sequentially performs the processing for estimating the self-location of the moving body 1 by using the detection information of the camera 7, and the third self-location estimation processing unit 13 is a functional unit that sequentially performs the processing for estimating the self-location of the moving body 1 by using the detection information of the magnetic sensor 8.

In the present embodiment, the self-location of the moving body 1 is, more specifically, a set of the location and the attitude (orientation) of the moving body 1 as observed in a global coordinate system arbitrarily set in an environment in which the moving body 1 travels. In the following description, the self-locations estimated by the first to the third self-location estimation processing units 11 to 13 may be referred to as the estimated locations and attitudes.

Further, the weighting factor learning unit 14 is a functional unit that outputs weighting factors corresponding to each of the first to the third self-location estimation processing units 11 to 13 (more specifically, the weighting factors for the estimated locations and attitudes of the moving body 1 output from the first to the third self-location estimation processing units 11 to 13) according to state quantities A, B and C which are input from the first to the third self-location estimation processing units 11 to 13 and which will be described later, and the self-location identifying unit 15 is a functional unit that identifies the self-location of the moving body 1 (determines the estimated location and attitude of the moving body 1) by synthesizing the estimated locations and attitudes of the moving body 1 output from the first to the third self-location estimation processing units 11 to 13 according to the weighting factors output from the weighting factor learning unit 14.

The following will describe in detail each of the foregoing functional units and the whole processing performed by the self-location estimation processing device 10.

The processing by the first to the third self-location estimation processing units 11 to 13 is carried out as described below. The first self-location estimation processing unit 11 receives the detection information of the LRF 6 and the odometry sensor 5 and also receives the map data (e.g. a two-dimensional occupied grid map) of an environment in which the moving body 1 travels. In this case, the map data is held in a memory of the self-location estimation processing device 10 beforehand or downloaded, as needed, from an external server or the like.

Then, the first self-location estimation processing unit 11 sequentially estimates the self-location (sequentially determines the estimated location and attitude) of the moving body 1 by a predetermined algorithm for estimating the self-location on the basis of the detection information of the LRF 6 (the distance measurement data of an external object in an area around the moving body 1), the detection information of the odometry sensor 5, and the map data.

In the present embodiment, the first self-location estimation processing unit 11 uses, as the algorithm for estimating the self-location, an algorithm for estimating the self-location by using a particle filter, such as an algorithm of a publicly known technique called AMCL (Adaptive Monte Carlo Localization). The algorithm corresponds to the B-th algorithm in the present invention.

According to the AMCL algorithm, the self-location of the moving body 1 is sequentially estimated by the processing described below. First, a plurality of particles in the particle filter are generated in the vicinity of the moving body 1 according to the initial location and the initial attitude (orientation) of the moving body 1. Then, a new movement location of each particle is estimated according to the travel velocity (the translational velocity and the angular velocity) of the moving body 1 estimated from the detection information of the odometry sensor 5.

Subsequently, the distance measurement data of the external object around the moving body 1 obtained by the LRF 6 is acquired, and the likelihood of the new movement location of each particle is calculated on the basis of the distance measurement data and the map data. Then, particles with low likelihood are eliminated by resampling, and further, new particles are generated in the vicinity of the particles with high likelihood.

According to the AMCL algorithm, the self-location of the moving body 1 is sequentially estimated (the estimated location and attitude of the moving body 1 are sequentially determined) on the basis of the time series of the locations of particles with high likelihood obtained by sequentially performing the processing described above. In addition, according to the algorithm, a covariance (more specifically, variance and covariance) as a state quantity related to the certainty of estimated location and attitude is generated in the process of performing the estimation processing.

Then, the first self-location estimation processing unit 11 sequentially outputs the self-location (the estimated location and attitude) of the moving body 1 estimated by the AMCL algorithm as described above and the estimation time that indicates the time when the estimation is performed, and also outputs the foregoing covariance (the variance and covariance) as a state quantity A associated with the certainty of the estimated location and attitude.

The second self-location estimation processing unit 12 receives a captured image (a captured image of the ceiling above the moving body 1) as the detection information of the camera 7. In the present embodiment, the camera 7 is a stereo camera, so that the detection information (the captured image) of the camera 7 input to the second self-location estimation processing unit 12 is a stereo image (a pair of captured images). However, the camera 7 is not limited to a stereo camera, and may alternatively be a monocular camera.

Then, the second self-location estimation processing unit 12 sequentially estimates the self-location (sequentially determines the estimated location and attitude) of the moving body 1 by a predetermined algorithm for estimating the self-location from the input captured image.

In the present embodiment, second self-location estimation processing unit 12 uses, as the algorithm for estimating the self-location, an algorithm that detects feature points from input captured images and matches the features points with feature points detected from captured images input in the past. To be more specific, the second self-location estimation processing unit 12 uses, as the algorithm, an algorithm of, for example, a publicly known technique called ORB_SLAM. The algorithm corresponds to the A-th algorithm in the present invention.

According to the ORB_SLAM algorithm, the self-location of the moving body 1 is sequentially estimated by the processing described below. The initial location of the moving body 1 is set, and then an image captured by the camera 7 (a stereo image) is sequentially input to the second self-location estimation processing unit 12. Next, for each input captured image, processing for detecting ORB feature points from the captured image is sequentially performed. The initial location of the moving body 1 may be set on the basis of, for example, the detection information of the LRF 6.

Then, the ORB feature point detected from a newly input captured image (a captured image at time t) and the ORB feature point detected from a past captured image previously input (an image captured at time t−Δt) are compared to perform matching of the ORB feature points. In the matching, ORB feature points which have the magnitude of a difference in feature amount (absolute value) of a predetermined threshold value or less are determined to be the same ORB feature points (ORB feature points that correspond to each other).

Subsequently, the travel amount and the travel direction of the moving body 1 in the period between the foregoing two times t and t−Δt are estimated on the basis of the matching. Further, the estimated location and attitude of the moving body 1 at time t are determined on the basis of the estimated values of the travel amount and the travel direction and the estimated location and attitude of the moving body 1 at time t−Δt. The estimated location and attitude of the moving body 1 determined by the ORB_SLAM algorithm may be reset to the location and attitude of the moving body 1 recognized on the basis of the detection information of the LRF 6 each time, for example, the number of frames of the captured images input to the first self-location estimation processing unit 12 reaches a predetermined number.

According to the ORB_SLAM algorithm, the self-location of the moving body 1 is sequentially estimated (the estimated location and attitude of the moving body 1 are sequentially determined) by sequentially performing the processing described above. Further, according to the algorithm, in the process of performing the estimation processing, the estimated velocity and the angular velocity (the estimated values of the translational velocity and the angular velocity) of the moving body 1, the quantity (total quantity) of detected ORB feature points and matching quantity (the quantity of the ORB feature points determined to be the same by the matching), the error value of an error function (the difference in the feature amount in the matching), and an estimation condition (the degree of the estimation accuracy of the estimated velocity and angular velocity of the moving body 1) are generated as the state quantities associated with the certainty of the estimated location and attitude.

Then, the second self-location estimation processing unit 12 sequentially outputs the self-location (estimated location and attitude) of the moving body 1 estimated by the ORB_SLAM algorithm as described above, and the estimation time, which is the time when the estimation is performed. Further, the second self-location estimation processing unit 12 outputs the estimated velocity and the angular velocity (the estimated values of the translational velocity and the angular velocity) of the moving body 1, the quantity of detected ORB feature points and matching quantity, the error value of an error function (the difference in the feature amount in the matching), and an estimation condition as a state quantity B associated with the certainty of the estimated location and attitude. In place of the quantity of ORB feature points and the matching quantity, the ratio of the matching quantity to the quantity (total quantity) of the ORB feature points may be output.

The third self-location estimation processing unit 13 receives the detection data of magnetism as the detection information of the magnetic sensor 8 and the detection information of the odometry sensor 5, and the magnetic map data of an environment in which the moving body 1 travels. In this case, the magnetic map data is stored in a memory of the self-location estimation processing device 10 in advance, or downloaded, as needed, from an external server or the like. Then, the third self-location estimation processing unit 13 sequentially estimates the self-location (sequentially determines the estimated location and attitude) of the moving body 1 by a predetermined algorithm for estimating the self-location on the basis of the detection data of magnetism, the detection information of the odometry sensor 5, and the magnetic map data, which have been input.

In the present embodiment, the third self-location estimation processing unit 13 uses, as the algorithm for estimating the self-location, an algorithm for estimating the self-location by using a particle filter, e.g., AMCL as with the first self-location estimation processing unit 11. The algorithm corresponds to the C-th algorithm in the present invention.

According to the algorithm, first, a plurality of particles in the particle filter are generated in the vicinity of the moving body 1 according to the initial location and the initial attitude (orientation) of the moving body 1. Then, a new movement location of each particle is estimated according to the travel velocity (the translational velocity and the angular velocity) of the moving body 1 estimated from the detection information of the odometry sensor 5. Subsequently, the detection data of magnetism (the detection data of magnetism acting on the moving body 1) obtained by the magnetic sensor 8 is acquired, and the likelihood of the new movement location of each particle is calculated on the basis of the detection data and the magnetic map data. Then, particles with low likelihood are eliminated by resampling, and further, new particles are generated in the vicinity of the particles with high likelihood.

According to the AMCL algorithm of the third self-location estimation processing unit 13, the self-location of the moving body 1 is sequentially estimated (the estimated location and attitude of the moving body 1 are sequentially determined) by sequentially performing the processing described above. In addition, according to the algorithm, a covariance (more specifically, variance and covariance) as a state quantity associated with the certainty of the estimated location and attitude is generated in the process of performing the estimation processing.

Then, the third self-location estimation processing unit 13 sequentially outputs the self-location (the estimated location and attitude) of the moving body 1 estimated by the AMCL algorithm as described above and the estimation time that indicates the time when the estimation is performed, and also outputs the foregoing covariance (the variance and covariance) as a state quantity C associated with the certainty of the estimated location and attitude.

The state quantities A, B and C output from the first to the third self-location estimation processing units 11 to 13, respectively, are input to the weighting factor learning unit 14. The weighting factor learning unit 14 in the present embodiment is composed of a neural network. In the neural network, multimodal learning, which uses feature vectors composed of the state quantities A, B and C as multimodal information, is implemented in advance.

The multimodal learning is, more specifically, learning that generates, from feature vectors composed of various state quantities A, B and C, weighting factors (the weighting factors corresponding to the estimated locations and attitudes output from the first to the third self-location estimation processing units 11 to 13) equivalent to the degrees indicating how properly the processing for estimating the self-location of the moving body 1 by each of the algorithms of the first to the third self-location estimation processing units 11 to 13 is being performed as compared with other algorithms.

In the neural network of the weighting factor learning unit 14, the foregoing multimodal learning is performed in advance. Therefore, the weighting factor learning unit 14 receives the state quantities A, B and C from the first to the third self-location estimation processing units 11 to 13, respectively, and generates, by the neural network, the weighting factors corresponding to the first to the third self-location estimation processing units 11 to 13 from the feature vectors composed of the state quantities A, B and C, and outputs the generated weighting factors.

In this case, basically, the neural network generates the weighting factors corresponding to the first to the third self-location estimation processing units 11 to 13 such that the value of a weighting factor increases as the certainty of estimated location and attitude of the moving body 1 output from the first to the third self-location estimation processing units 11 to 13 increases, and outputs the generated weighting factors.

For example, in a situation in which the processing for estimating the self-location of the moving body 1 by the first self-location estimation processing unit 11 is performed more properly than the second self-location estimation processing unit 12 and the third self-location estimation processing unit 13, the weighting factors are generated such that the weighting factor corresponding to the first self-location estimation processing unit 11 has a value that is greater than the values of the weighting factors corresponding to the second self-location estimation processing unit 12 and the third self-location estimation processing unit 13.

Further, for example, in a situation in which the processing for estimating the self-location of the moving body 1 by the second self-location estimation processing unit 12 is performed more properly than the first self-location estimation processing unit 11 and the third self-location estimation processing unit 13, the weighting factors are generated such that the weighting factor corresponding to the second self-location estimation processing unit 12 has a value that is greater than the values of the weighting factors corresponding to the first self-location estimation processing unit 11 and the third self-location estimation processing unit 13.

Further, for example, in a situation in which the processing for estimating the self-location of the moving body 1 by the third self-location estimation processing unit 13 is performed more properly than the first self-location estimation processing unit 11 and the second self-location estimation processing unit 12, the weighting factors are generated such that the weighting factor corresponding to the third self-location estimation processing unit 13 has a value that is greater than the values of the weighting factors corresponding to the first self-location estimation processing unit 11 and the second self-location estimation processing unit 12.

The weighting factors corresponding to the first to the third self-location estimation processing units 11 to 13 output from the weighting factor learning unit 14 are input to the self-location identifying unit 15. Further, the estimated locations and attitudes of the moving body 1 and the estimation times are also input to the self-location identifying unit 15 from the first to the third self-location estimation processing units 11 to 13.

Then, the self-location identifying unit 15 identifies, as the self-location of the moving body 1, the location and attitude obtained by synthesizing the locations and attitudes estimated by the first to the third self-location estimation processing units 11 to 13 at the same time according to the input weighting factors. In other words, the sum of the results obtained by multiplying the locations and attitudes estimated by the first to the third self-location estimation processing units 11 to 13 by the weighting factors corresponding thereto is identified as the self-location of the moving body 1. The sum of the weighting factors at this time is 1.

In the present embodiment, the self-location estimation processing device 10 sequentially identifies the self-location of the moving body 1 as described above. In this case, the self-location of the moving body 1 is identified by synthesizing the self-locations estimated by the first to the third self-location estimation processing units 11 to 13 by using the weighting factors determined according to the state quantities A, B and C for each of the first to the third self-location estimation processing units 11 to 13 by the weighting factor learning unit 14.

Further, in this case, the weighting factor learning unit 14 receives, as information, the state quantities A, B and C for each of the first to the third self-location estimation processing units 11 to 13, so that the weighting factor learning unit 14 can learn in advance the weighting factors to output according to the state quantities A, B and C in various environments in which the moving body 1 travels.

Hence, the self-location estimation processing device 10 can estimate (identify) the self-location of the moving body 1 with high reliability in various environments in which the moving body 1 travels.

The present invention is not limited to the embodiment described above, and can adopt other embodiments. The following will illustrate some other embodiments.

In the foregoing embodiment, the self-location estimation processing device 10, which is provided with the three different self-location estimation processing units, namely, the first to the third self-location estimation processing units 11 to 13, has been illustrated. However, the self-location estimation processing device 10 may, for example, not be provided with one of the first to the third self-location estimation processing units 11 to 13. Alternatively, the self-location estimation processing device 10 may be provided with more self-location estimation processing units.

Further, in the foregoing embodiment, the neural network that performs the multimodal learning has been illustrated as the weighting factor learning unit 14. However, a recursive neural network (RNN) or the like, such as an LSTM (long short-term memory), for example, may be used as the weighting factor learning unit 14.

Further, in the foregoing embodiment, the estimated velocity and angular velocity (the estimated values of the translational velocity and the angular velocity) of the moving body 1, the quantity of detected ORB feature points and the matching quantity, the error value of an error function (the difference in the feature amount in the matching), and an estimation condition have been used as the state quantity B related to the second self-location estimation processing unit 12. However, some of the state quantities, e.g., the estimated velocity and angular velocity of the moving body 1, the error value of an error function, and the estimation condition may be omitted.

Further, in the foregoing embodiment, the LRF 6 has been used as the distance measuring sensor. However, an ultrasonic distance measuring sensor, for example, may be used in place of the LRF 6.

Further, in the foregoing embodiment, the wheeled moving body 1 has been illustrated as a moving body. However, a moving body to which the present invention is applied is not limited to a wheeled moving body, and may alternatively be, for example, a legged moving body.

The invention claimed is:

1. A self-location estimation method for a moving body, the moving body including a plurality of sensors and a self-location processing device including a computer and in communication with the plurality of sensors, the plurality of sensors including a camera that images an external world of the moving body, a distance measuring sensor that measures a distance to an external object of the moving body, and a magnetic sensor that detects magnetism acting on the moving body, the self-location estimation method being executed by the self-location processing device and comprising:

a first step of estimating a self-location of a moving body from detection information of the plurality of sensors by each of a plurality of algorithms using the detection information of one or more sensors among the plurality of sensors, the plurality of algorithms including an A-th algorithm, a B-th algorithm, and a C-th algorithm;

a second step of determining a weighting factor for each of the plurality of algorithms by inputting, to a trained neural network, one or more state quantities which are obtained for each of the plurality of algorithms by estimation processing of each algorithm and which are state quantities associated with certainty of the self-location estimated by each algorithm, and then determining the weighting factor for each of the plurality of algorithms by the neural network based on the input state quantities; and a third step of identifying, as a self-location of the moving body, a location obtained by synthesizing the self-locations estimated by each of the plurality of algorithms by using the determined weighting factors, wherein the A-th algorithm is an algorithm configured to detect a feature point from a captured image of the camera and to sequentially perform processing for matching the detected feature point with a feature point detected from an image captured earlier than the captured image in order to estimate the self-location of the moving body, and the state quantity related to the A-th algorithm includes a state quantity that indicates a ratio of a quantity of feature points mapped by the matching to a total quantity of feature points detected from the captured image, and estimated values of translational velocity and angular velocity of the moving body obtained by the A-th algorithm, wherein the B-th algorithm is an algorithm which estimates the self-location of the moving body by using distance measurement data obtained by the distance measuring sensor and a particle filter, and the state quantity related to the B-th algorithm includes a covariance generated in the process of estimating the self-location of the moving body by the B-th algorithm, and wherein the C-th algorithm is an algorithm which estimates the self-location of the moving body by using magnetism detection data obtained by the magnetic sensor and a particle filter, and the state quantity related to the C-th algorithm includes a covariance generated in the process of estimating the self-location of the moving body by the C-th algorithm.

* * * * *